US011593160B2

(12) United States Patent
Bezalel et al.

(10) Patent No.: US 11,593,160 B2
(45) Date of Patent: Feb. 28, 2023

(54) VIRTUAL COMPUTING CLUSTER RESOURCE SCHEDULER

(71) Applicant: HiveIO Inc., Hoboken, NJ (US)

(72) Inventors: Ofer Bezalel, Hoboken, NJ (US); Pratik Gaikwad, Hoboken, NJ (US); Ian Reinhart Geiser, Westchester, PA (US); John Joseph Mullen, Norristown, PA (US)

(73) Assignee: HiveIO Inc., Hoboken, NJ (US)

( * ) Notice: Subject to any disclaimer, the term of this patent is extended or adjusted under 35 U.S.C. 154(b) by 414 days.

(21) Appl. No.: 17/030,284

(22) Filed: Sep. 23, 2020

(65) Prior Publication Data

US 2021/0089350 A1 Mar. 25, 2021

Related U.S. Application Data

(60) Provisional application No. 62/904,140, filed on Sep. 23, 2019.

(51) Int. Cl.
*G06F 9/48* (2006.01)
*G06F 9/455* (2018.01)
(Continued)

(52) U.S. Cl.
CPC ........ *G06F 9/4881* (2013.01); *G06F 9/45558* (2013.01); *G06F 11/3027* (2013.01);
(Continued)

(58) Field of Classification Search
None
See application file for complete search history.

(56) References Cited

U.S. PATENT DOCUMENTS

| 7,900,005 B2 * | 3/2011 | Kotsovinos | ........... G06F 9/5083 |
| | | | 711/E12.103 |
| 8,019,861 B2 * | 9/2011 | Ginzton | .............. G06F 9/45558 |
| | | | 709/224 |

(Continued)

OTHER PUBLICATIONS

Zhou et al. "VMCTune: A Load Balancing Scheme for Virtual Machine Cluster Based on Dynamic Resource Allocation", 2010 IEEE, pp. 81-86.*

(Continued)

*Primary Examiner* — Van H Nguyen
(74) *Attorney, Agent, or Firm* — Hodgson Russ LLP

(57) ABSTRACT

In some embodiments, a method for cluster resource scheduling, includes determining at least one load score; determining a memory score; determining an IO score; and monitoring a message bus for candidate messages when each of the at least one load score, memory score, and IO score is less than a pre-determined health threshold. In some embodiments, a host computer system for hosting a plurality of virtual machines (VMs), includes: a memory; a network adapter for communicating with the cluster by way of a message bus; a processor in electronic communication with the memory and the network adapter, wherein the processor is programmed to: determine at least one load score; determine a memory score; determine an IO score; and monitor the message bus for candidate messages when each of the at least one load score, memory score, and IO score is less than a pre-determined health threshold.

14 Claims, 2 Drawing Sheets

(51) Int. Cl.
   *G06F 13/20* (2006.01)
   *G06F 11/34* (2006.01)
   *G06F 11/30* (2006.01)
   *G06Q 10/0631* (2023.01)

(52) U.S. Cl.
   CPC ............ *G06F 11/349* (2013.01); *G06F 13/20* (2013.01); *G06F 2009/45579* (2013.01); *G06Q 10/06312* (2013.01)

(56) References Cited

U.S. PATENT DOCUMENTS

| | | | | |
|---|---|---|---|---|
| 8,468,288 | B2* | 6/2013 | Corry | G06F 9/4856 718/1 |
| 8,843,933 | B1* | 9/2014 | Holler | G06F 9/45533 718/104 |
| 9,690,608 | B2* | 6/2017 | Sampathkumar | H04L 47/70 |
| 9,804,895 | B2* | 10/2017 | Castellano | G06F 9/5005 |
| 9,934,076 | B2* | 4/2018 | Padala | G06F 9/5088 |
| 10,228,969 | B1* | 3/2019 | Gupta | G06F 9/541 |
| 10,382,352 | B2* | 8/2019 | Gamage | H04L 43/0817 |
| 10,705,873 | B2* | 7/2020 | Feng | G06F 9/4831 |
| 2014/0082202 | A1* | 3/2014 | Zhao | G06F 9/45558 709/226 |

OTHER PUBLICATIONS

Lazri et al. "When Dynamic VM Migration Falls Under the Control of VM Users", 2013 IEEE, pp. 395-402.*
Srinivas et al. "A Framework for Efficient Virtual Machine Migration", 2018 IEEE, pp. 1-6.*
Fan et al. "A Resource Scheduling Method with Rough Set for Virtual Cluster", 2016 IEEE, pp. 652-654.*

* cited by examiner

VIRTUAL COMPUTING CLUSTER RESOURCE SCHEDULER

CROSS-REFERENCE TO RELATED APPLICATIONS

This application claims priority to U.S. Provisional Application No. 62/904,140, filed on Sep. 23, 2019, the disclosure of which is incorporated herein by reference.

FIELD OF THE DISCLOSURE

The present disclosure relates to resource scheduling for a cluster of host computers in a virtualized computer environment.

BACKGROUND OF THE DISCLOSURE

A host computer system is a physical server configured to run one or more virtual machines (VMs). A hypervisor is a software solution installed on a physical server (known as a "host" computer) that virtualizes the resources of the server to allow multiple virtual machines ("guests") to run on the server at the same time, sharing the server's resources. Controlling the resources that each virtual machine (VM) is able to access is a complex task. When a virtual machine starts, the hypervisor allocates it with a specific amount of the server's CPU, RAM, and storage resources. As more and more VMs are started on the server, the physical resources are shared between the guests.

Hosts may belong to a cluster of hosts, such that guest VMs may be migrated between hosts of a cluster for purposes such as load leveling, redundancy, etc. Simply put, a host become overloaded when its VMs require more resources than the host has to offer. This condition may occur where the resources that one or more VMs require increases beyond a limit. In another example, an overloaded condition may occur when a VM is started and the available resources are insufficient. In yet another example, a host may become overloaded when a guest VM is migrated to the host and requires resources exceeding those available. Previous cluster technologies have utilized a dedicated management infrastructure, which includes hosts, virtual machines, and databases to monitor and police the resources available. These will also consume other cluster resources such as network bandwidth, in order to perform their policing function.

BRIEF SUMMARY OF THE DISCLOSURE

In a first aspect, the present disclosure may be embodied as a computer-implemented method for cluster resource scheduling. The method includes determining at least one load score ($S_L$). The at least one load score ($S_L$) may be based on a load average value. The at least one load score $S_L$ may be determined based on a measurement window (t) according to $$S_{L,t} = \left(\frac{L_t}{\alpha_t N_C}\right) * 100,$$

where $\overline{L}_t$ is the load average value over measurement window t, $N_C$ is the number of processor cores, and $\alpha_t$ is a pre-determined coefficient for the measurement window t. The load scores may be determined for each of a 1-, a 5-, and a 15-minute measurement window. For example, the coefficients for each measurement window may be: $\alpha_1=1.5$, $\alpha_5=1.3$, and $\alpha_{15}=1.1$.

The method further includes determining a memory score ($S_M$). The memory score ($S_M$) may be based on a percentage of host memory in use. The method also includes determining an IO score ($S_{IO}$). The IO score ($S_{IO}$) may be a CPU IO Wait Time percentage divided by 25.

In the method, a message bus is monitored for candidate messages when each of the at least one load score, memory score, and IO score is less than a pre-determined health threshold. In some embodiments, VM creation activities may be paused when any one of the load score, the memory score, or the IO score is greater than the health threshold.

In some embodiments, the method may further include determining a duress status based on a metric in duress, wherein the metric in duress is determined by one or more of a load score for a 15 minute measurement window, the memory score, and the IO score is remains over the pre-determined health threshold for a duress period (e.g., greater than or equal to 5 minutes, 10 minutes, etc.); selecting a guest candidate for migration when a duress status is determined; and publishing a candidate message on the message bus, the candidate message comprising guest candidate information. The guest candidate may be selected by: calculating a standard deviation of the guest VM values for the metric in duress; and selecting a guest candidate as a guest VM falling with an SD threshold (e.g., +/− one standard deviation, 1.5 standard deviations, etc.)

The method may further include ordering guest VMs based on guest VM values for the metric in duress. The method may further include receiving a migration request from a target host of the cluster; and migrating the guest candidate to the migration target. The method may further include receiving a candidate message from a cluster host, the candidate message comprising guest candidate information; determining a resource sufficiency based on the guest candidate information; and sending a migration request to the cluster host indicating availability to receive a guest candidate.

In another aspect, the present disclosure may be embodied as a host computer system for hosting a plurality of virtual machines (VMs), the host computer system being a member of a cluster of hosts. The host computer system includes a memory; a network adapter for communicating with the cluster by way of a message bus; a processor in electronic communication with the memory and the network adapter. The processor is programmed to determine at least one load score ($S_L$). The at least one load score ($S_L$) may be based on a load average value. The at least one load score $S_L$ may be determined based on a measurement window (t) according to $$S_{L,t} = \left(\frac{L_t}{\alpha_t N_C}\right) * 100,$$

where $\overline{L}_t$ is the load average value over measurement window t, $N_C$ is the number of processor cores, and $\alpha_t$ is a pre-determined coefficient for the measurement window t. The load scores may be determined for each of a 1, a 5, and a 15 minute measurement window. For example, the coefficients for each measurement window may be: $\alpha_1=1.5$, $\alpha_5=1.3$, and $\alpha_{15}=1.1$.

The processor is further programmed to determine a memory score ($S_M$). The memory score ($S_M$) may be based on a percentage of host memory in use. The processor is further programmed to determine an IO score ($S_{IO}$). The IO score ($S_{IO}$) may be a CPU IO Wait Time percentage divided by 25. The processor is further programmed to monitor the message bus for candidate messages when each of the at least one load score, memory score, and IO score is less than a pre-determined health threshold.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
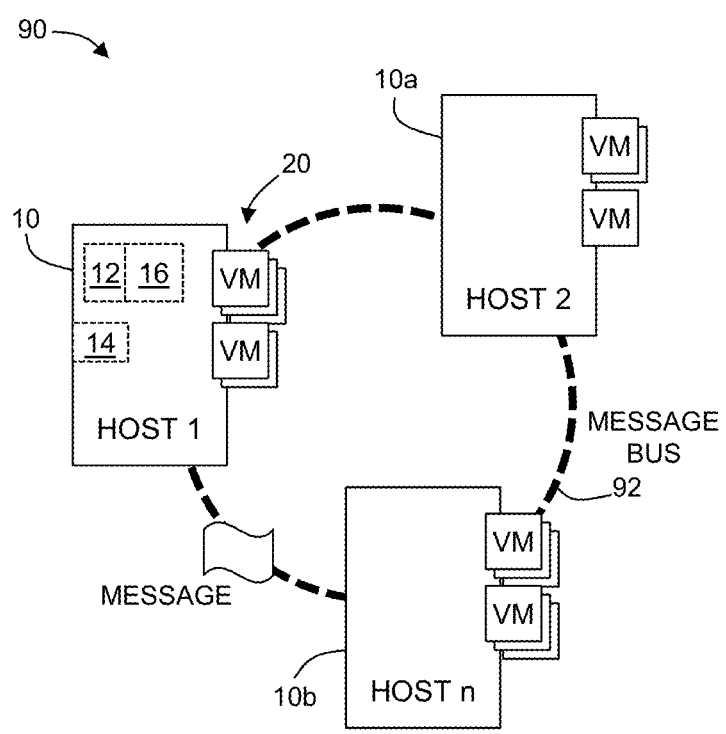
FIG. 1 is a diagram depicting a cluster according to an embodiment of the present disclosure.
Figure 2:
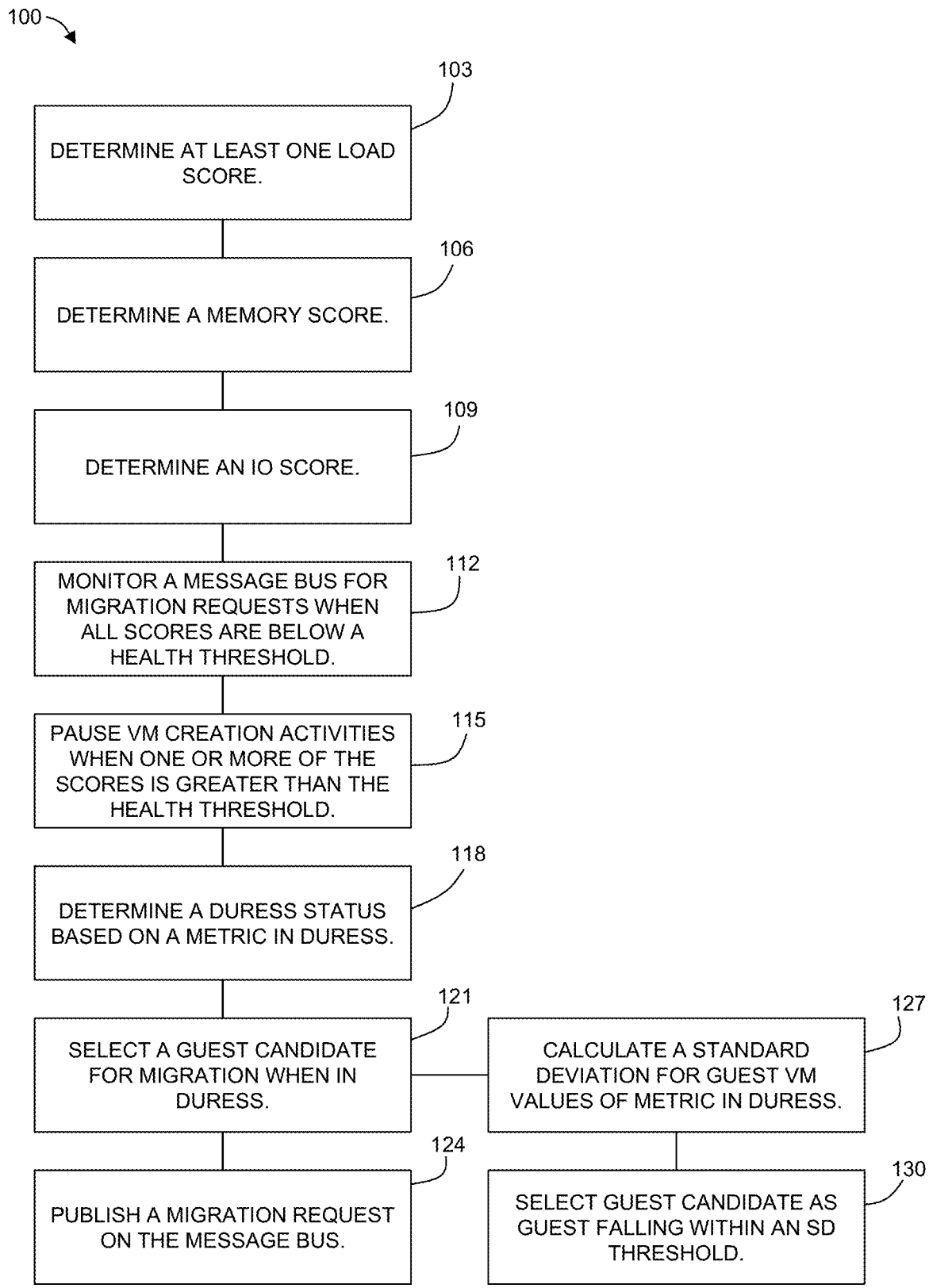
FIG. 2 is a chart showing a method according to another embodiment of the present disclosure.

The present disclosure provides a cluster resource scheduler for more evenly distributing virtual machines across a group of hypervisors (host computer systems) using a peer-to-peer distributed architecture.

A hypervisor is a software solution installed on a physical server (known as a "host" computer) that virtualizes the resources of the server to allow multiple virtual machines ("guests") to run on the server at the same time, sharing the server's resources. Controlling the resources that each virtual machine ("VM") is able to access is a complex task. When a virtual machine starts, the hypervisor allocates it with a specific amount of the server's CPU, RAM, and storage resources. As more and more VMs are started on the server, the physical resources are shared between the guests.

Hosts may belong to a cluster of hosts, such that guest VMs may be migrated between hosts within a cluster for purposes such as load balancing, redundancy, etc. Within a cluster, each hypervisor should generally not require awareness of other hypervisors and they are unaware of resource utilization across a collection of hosts or whether the number of VMs is equally distributed across the cluster.

The present disclosure provides the capability to manage multiple hosts in a peer-to-peer distributed architecture, leveraging an inter-host communication channel called the message bus. Using the present technology, a cluster is defined by any number of hosts interconnected via a common message bus. This message bus is configured to provide a secure, distributed communication channel that allows for any host to manage itself, and make other hosts aware of its actions in the cluster, through a publish-subscribe model. Each host makes decisions for itself in the cluster autonomously, without the need for a dedicated management infrastructure which would normally be instantiated using a set of support servers and databases, running physical or virtual machines.

Managing the distribution of VMs across the cluster is a complex task. The amount of host resources that a VM can consume at any one time is variable and will depend on a number of factors including time of day/month/year, user operations, application profile, external resource availability such as, for example, storage, and the competition for a single resource such as, for example, memory. Such factors should be considered when deciding how to distribute VMs to ensure an even allocation of the resources available within the cluster, and to avoid frequent movement of VMs between hosts, which, due to the overhead of migrating a VM between hosts, would ultimately have the adverse effect of increasing the load on the cluster and reducing resources available to VMs.

Embodiments of the present-disclosure use a cluster resource scheduler that runs on each host in a cluster, and each host independently determines its own status, allowing hosts to join the cluster and instantly take part in the distribution and management of VMs. Embodiments of the present disclosure provide many advantages, including without limitation:

no requirement for management infrastructure to manage VM distribution across a cluster;

no ongoing negotiations—the self-scoring and eviction methodology means there is no continual tracking of resource utilization on a host within the cluster (each host is responsible for itself);

servers with large amounts of resources can be mixed with hosts with small amounts of resources, and their respective resource availabilities will automatically be taken into account using the presently-disclosed cluster resource scheduling methodology;

ensuring only VMs that will have a positive impact on overall distribution of resource utilization of the cluster are moved; and dynamic selection of VMs based on a target score. The VM to be evicted will not be the busiest VM or the lightest loaded, it will be a VM that has been identified to minimize the impact on the end user or application but gain most benefit for the equalization of resource usage across the cluster.

In a first aspect, the present disclosure may be embodied as a method 100 for cluster resource scheduling. The method 100 includes determining 103 at least one load score ($S_L$) based on a load average value. A load average is a parameter generally calculated by an operating system kernel. The load average may be, for example, the average amount of computational work performed by a computer system during a period of time (a "measurement window" (t)). In a particular example, the Linux operating system generally provides load average values for periods of one, five, and fifteen minutes.

In some embodiments, the load score ($S_L$) for measurement window (t) may be calculated according to:

$$S_{L,t} = \left(\frac{\overline{L}_t}{\alpha_t N_C}\right) * 100, \quad (1)$$

where $\overline{L}_t$ is the load average value over measurement window t, $N_C$ is the number of processor cores, and $\alpha_t$ is a pre-determined coefficient for the measurement window t. The method 100 may include calculating one-, five-, and fifteen-minute load scores. Appropriate coefficients may be selected to, for example, emphasize load scores over longer measurement windows more than those calculated over shorter measurement windows. For example, the load scores for an exemplary embodiment may use coefficients of $\alpha_1=1.5$, $\alpha_5=1.3$, and $\alpha_{15}=1.1$.

The method 100 further includes determining 106 a memory score ($S_M$). In some embodiments, the memory score is calculated as a percentage of host memory in use (consumed). For example, a host may have 256 GB of physical RAM, where 192 GB is in use. The memory score may be calculated as 192 GB/256 GB)*100, or 75%. In such a method, it can be seen that the memory score is calculated for an instant in time. Other memory score calculations can be used incorporating, for example, average values over a measurement window, additional or alternative memory statistics, and the like.

The method 100 further includes determining 109 an input-output (IO) score ($S_{IO}$). For example, the IO score may based on a CPU IO Wait Time percentage. CPU IO Wait Time refers to the number of CPU cycles spent in an IO wait status (or the percentage of total CPU cycles which are spent in IO wait status). The IO score may be calculated by dividing a CPU IO Wait Time percentage by a value representing the maximum value for this metric. In a particular example, it may be determined that a CPU should spend no more than 25% of CPU cycles in the IO wait status, and that a server is no longer healthy once the CPU IO Wait Time percentage exceeds 90% of this 25% value (i.e., 22.5%). As such, the IO score may be the CPU Wait Time percentage divided by 25.

Each of the scores (load score, memory score, IO score) is compared to a pre-determined health threshold to determine a health of the host. In some embodiments, the health threshold is the same value for each of the types of scores. For example, the health threshold may be 90, and if each score is below 90, then the host determines itself to be healthy. In other embodiments, one or more of the scores may have a different health threshold from the those of the other scores. For example, the load score may have a health threshold of 80, while the memory and IO scores each have a health threshold of 90. In some embodiments, the score calculations are adjusted by coefficients and/or additional terms such that the health threshold may have the same value for each score type.

If a host determines itself to be healthy, the host may then avail itself to receiving candidate message from other hosts on the cluster (i.e., requests to migrate a guest VM on another host). For example, the method 100 may include monitoring 112 a message bus for candidate messages when each of the at least one load score, memory score, and IO score is less than a pre-determined health threshold(s). In a publish-subscribe sense, the host may subscribe to candidate messages published by other hosts within the cluster. In other words, if a host determines itself not to be healthy (e.g., because one or more of the scores exceeds its respective health threshold), then the host would ignore candidate messages published on the message bus.

The method 100 may be repeated, in whole or in part, in order to continually determine a health of the host. For example, the steps of determining 103 a load score, determining 106 a memory score, and determining 109 an IO score and evaluating the scores against a health threshold may be periodically repeated (e.g., repeated every one minute). In some embodiments, the method 100 may be performed by a host to determine its own status. In this way, each host of a cluster independently determines its own and whether or not it is able to accept additional guest VMs (i.e., whether or not to listen to the message bus for candidate messages).

In some embodiments, the method 100 may further include determining 118 a duress status. The duress status may be determined according to a metric in duress (e.g., a score, such as the load score, memory score, and/or IO score). For example, the load score may be a metric in duress where a 15-minute load score exceeds the health threshold. In another example, the memory score or the IO score may be metrics in duress when their respective scores remain over the health threshold for a period of time exceeding a duress period (e.g., 5 minutes, 10 minutes, 12 minutes, etc.)

When a host determines 118 that it has a duress status due to a metric in duress, the host may select 121 a guest VM for migration (a "guest candidate"). Once a guest candidate is selected 121, the host may then publish 124 a candidate message on the message bus. The candidate message may include guest candidate information (e.g., guest VM metrics, size, etc.)

In order to select an advantageous guest to migrate, the resource overhead for migrating VMs (for both the source and the target) is taken into account. As such the VM selected for migration should make a discernible load reduction with regard to the duress metric, yet avoid a scenario where the destination host is caused to go into duress (a.k.a. the "hot potato"). In some embodiments, the guest candidate is selected 121 by calculating 127 a guest metric value for each guest, where the guest metric is related to the host metric in duress. For example, if the host metric in duress is its memory score, the amount of memory allocated to each guest VM is retrieved and a standard deviation for the value is calculated. The guest candidate is selected as a guest VM whose metric value falls within an SD threshold value. More particularly, if the SD threshold is one standard deviation, then a guest candidate is selected 130 from those whose value falls within +/− one standard deviation. Other SD threshold values may be used such as, for example, 0.5 standard deviation, 1.5 standard deviations, or values between, or higher and lower thresholds, as will be apparent in light of the present disclosure.

Once a candidate message is published, on the message bus, those other host servers in the cluster that are listening for candidate messages on the message bus (i.e., those that have determined themselves to be healthy), will determine a resource sufficiency based on the guest candidate information of the candidate message. In particular, a host will receive a candidate message from a cluster host. The host will determine resource sufficiency. For example, where the guest candidate information includes the amount of RAM it has available to it and the percentage currently in use, the amount of CPU allocated to it, the size of disk, and its level of I/O activity over the preceding time being monitored. The host will determine whether its resource conditions would be sufficient for the amount of RAM, CPU, and I/O activity the VM requires. When the resource sufficiency is determined to be satisfactory, the host will send a migration request to the cluster host with the guest candidate (the "duress host"), where the migration request indicates the ability to receive the guest candidate of the candidate message.

The method may further comprise receiving a migration request from a target host of the cluster. In some cases, the duress host may receive a migration request from each of more than one target host. The host (duress host) may select from the migration requests. For example, the requesting host may select the first migration request received. In some embodiments, the host first to respond with a migration request is automatically the target host. The duress host migrates the guest candidate to the target host.

In another aspect, the present disclosure may be embodied as a host computer system 10 for hosting a plurality of virtual machines 20 (see FIG. 1). The host computer system 10 is a part of a cluster 90 of hosts 10,10a,10b. The host computer system 10 comprises a memory 12, such as, for example, dynamic RAM. The host 10 further comprises a network adapter 14 for communicating with the cluster 90. For example, the network adapter 14 may be used to communicate with the other hosts 10a,10b of the cluster 90 by way of a message bus 92. It should be noted that the message bus 92 may not be a hardware component, but a virtual communication channel using a pre-determined protocol. The host computer 10 includes a processor 16 in electronic communication with the memory 12 and the network adapter 14.

The processor 16 is configured (e.g., programmed) to perform any of the methods described herein. For example, the processor may be programmed to determine at least one load score ($S_L$) based on a load average value; determine a memory score ($S_M$) based on a percentage of host memory in use; and determine an IO score ($S_{IO}$) based on a CPU IO Wait Time percentage. The processor may further be programmed to monitor the message bus for candidate messages when each of the at least one load score, memory score, and IO score is less than a pre-determined health threshold.

The processor 16 may be in communication with and/or include a memory 12. The memory can be, for example, a Random-Access Memory (RAM) (e.g., a dynamic RAM, a static RAM), a flash memory, a removable memory, and/or so forth. In some instances, instructions associated with performing the operations described herein (e.g., determine a host health score, publish and/or subscribe to messages on a message bus, etc.) can be stored within the memory and/or a storage medium (which, in some embodiments, includes a database in which the instructions are stored) and the instructions are executed at the processor.

In some instances, the processor includes one or more modules and/or components. Each module/component executed by the processor can be any combination of hardware-based module/component (e.g., a field-programmable gate array (FPGA), an application specific integrated circuit (ASIC), a digital signal processor (DSP)), software-based module (e.g., a module of computer code stored in the memory and/or in the database, and/or executed at the processor), and/or a combination of hardware- and software-based modules. Each module/component executed by the processor is capable of performing one or more specific functions/operations as described herein. In some instances, the modules/components included and executed in the processor can be, for example, a process, application, virtual machine, and/or some other hardware or software module/component. The processor can be any suitable processor configured to run and/or execute those modules/components. The processor can be any suitable processing device configured to run and/or execute a set of instructions or code. For example, the processor can be a general purpose processor, a central processing unit (CPU), an accelerated/arithmetic processing unit (APU), a field-programmable gate array (FPGA), an application specific integrated circuit (ASIC), a digital signal processor (DSP), and/or the like.

In another aspect, the present disclosure may be embodied as a non-transitory, computer-readable medium, having instructions or computer code thereon for performing any method described herein. For example, the computer-readable medium may include instructions for determining at least one load score ($S_L$) based on a load average value; determining a memory score ($S_M$) based on a percentage of host memory in use; determining an IO score ($S_{IO}$) based on a CPU IO Wait Time percentage; and monitoring a message bus for candidate messages when each of the at least one load score, memory score, and IO score is less than a pre-determined health threshold.

Some instances described herein relate to a computer storage product with a non-transitory computer-readable medium (which can also be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other instances described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, instances may be implemented using Java, C++, .NET, or other programming languages (e.g., object-oriented programming languages) and development tools. Additional examples of computer code include, but are not limited to, control signals, encrypted code, and compressed code.

Although the present disclosure has been described with respect to one or more particular embodiments, it will be understood that other embodiments of the present disclosure may be made without departing from the spirit and scope of the present disclosure.

We claim:

1. A computer-implemented method for cluster resource scheduling, comprising:

determining at least one load score ($S_L$), wherein the at least one load score $S_L$ is determined based on a measurement window (t) according to:

where $\overline{L}_t$ is the load average value over measurement window t, $N_C$ is the number of processor cores, and $\alpha_t$ is a pre-determined coefficient for the measurement window t;

determining a memory score ($S_M$);

determining an input-output (IO) score ($S_{IO}$);

monitoring a message bus for candidate messages when each of the at least one load score, memory score, and IO score is less than a pre-determined health threshold;

determining a duress status based on a metric in duress, wherein the metric in duress is determined by one or more of a load score, the memory score, and the IO score remains over the pre-determined health threshold for a duress period;

selecting a guest candidate for migration when a duress status is determined, wherein the guest candidate is selected by calculating a standard deviation (SD) of guest virtual machine (VM) values for the metric in duress, and selecting the guest candidate as a guest VM falling with an SD threshold; and publishing a candidate message on the message bus, the candidate message comprising guest candidate information.

2. The computer-implemented method of claim 1, wherein the load scores are determined for each of a 1, a 5, and a 15 minute measurement window.

3. The computer-implemented method of claim 2, wherein the coefficients for each measurement window are: $\alpha_1=1.5$, $\alpha_5=1.3$, and $\alpha_{15}=1.1$.

4. The computer-implemented method of claim 1, wherein the memory score ($S_M$) is based on a percentage of host memory in use.

5. The computer-implemented method of claim 1, wherein the IO score ($S_{IO}$) is a CPU IO Wait Time percentage divided by 25.

6. The computer-implemented method of claim 1, further comprising pausing VM creation activities when any one of the load score, the memory score, or the IO score is greater than the health threshold.

7. The computer-implemented method of claim 1, further comprising ordering guest VMs based on guest VM values for the metric in duress.

8. The computer-implemented method of claim 1, further comprising:
receiving a migration request from a target host of the cluster; and
migrating the guest candidate to the migration target.

9. The computer-implemented method of claim 1, further comprising:
receiving a candidate message from a cluster host, the candidate message comprising guest candidate information;
determining a resource sufficiency based on the guest candidate information; and
sending a migration request to the cluster host indicating availability to receive a guest candidate.

10. A host computer system for hosting a plurality of virtual machines (VMs), the host computer system being a member of a cluster of hosts, the host computer system comprising:
a memory;
a network adapter for communicating with the cluster by way of a message bus;
a processor in electronic communication with the memory and the network adapter, wherein the processor is programmed to:
determine at least one load score ($S_L$), wherein the at least one load score $S_L$ is determined based on a measurement window (t) according to:
where $\overline{L}_t$ is the load average value over measurement window t, $N_C$ is the number of processor cores, and $\alpha_t$ is a pre-determined coefficient for the measurement window t;
determine a memory score ($S_M$);
determine an input-output (IO) score ($S_{IO}$);
monitor the message bus for candidate messages when each of the at least one load score, memory score, and IO score is less than a pre-determined health threshold;
determine a duress status based on a metric in duress, wherein the metric in duress is determined by one or more of a load score, the memory score, and the IO score remains over the pre-determined health threshold for a duress period;
select a guest candidate for migration when a duress status is determined, wherein the guest candidate is selected by calculating a standard deviation (SD) of guest VM values for the metric in duress, and selecting the guest candidate as a guest VM falling with an SD threshold; and
publish a candidate message on the message bus, the candidate message comprising guest candidate information.

11. The host computer system of claim 10, wherein the load scores are determined for each of a 1, a 5, and a 15 minute measurement window.

12. The host computer system of claim 11, wherein the coefficients for each measurement window are: $\alpha_1=1.5$, $\alpha_5=1.3$, and $\alpha_{15}=1.1$.

13. The host computer system of claim 10, wherein the memory score ($S_M$) is based on a percentage of host memory in use.

14. The host computer system of claim 10, wherein the IO score ($S_{IO}$) is a CPU IO Wait Time percentage divided by 25.

* * * * *